United States Patent
Gong et al.

(10) Patent No.: US 9,948,187 B2
(45) Date of Patent: Apr. 17, 2018

(54) SYSTEM AND METHOD FOR A SWITCHED-MODE POWER SUPPLY

(71) Applicant: Infineon Technologies Austria AG, Villach (AT)

(72) Inventors: Xiao Wu Gong, Singapore (SG); Yong Siang Teo, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 415 days.

(21) Appl. No.: 14/242,445

(22) Filed: Apr. 1, 2014

(65) Prior Publication Data
US 2015/0280574 A1   Oct. 1, 2015

(51) Int. Cl.
*H02M 3/335* (2006.01)

(52) U.S. Cl.
CPC ... *H02M 3/33507* (2013.01); *H02M 3/33523* (2013.01)

(58) Field of Classification Search
CPC ........ H02M 3/28; H02M 3/325; H02M 3/335; H02M 3/33507; H02M 3/33515; H02M 3/33523; H02M 3/3353; H02M 3/33538; H02M 3/33546; H02M 3/33553; H02M 1/44; H02M 1/4258; H02M 2001/0009; H02M 2001/0025; H02M 2001/0029
USPC .......... 363/15–21.18, 40–43, 74, 78, 79, 80, 363/95–99, 131–134; 323/205–211, 323/222–226, 235, 271–275, 282–288, 323/351; 331/111, 112, 113, 143–153
See application file for complete search history.

(56) References Cited

U.S. PATENT DOCUMENTS

| | | | | |
|---|---|---|---|---|
| 4,841,177 A | * | 6/1989 | Sugiyama | .......... G01R 19/1658 327/567 |
| 6,194,885 B1 | * | 2/2001 | Oshima | ............... H02M 1/4225 323/285 |
| 6,646,513 B1 | | 11/2003 | Neidorff | |
| 6,665,197 B2 | | 12/2003 | Gong et al. | |
| 7,034,627 B1 | | 4/2006 | Kudari | |
| 7,075,806 B2 | | 7/2006 | Ichikawa et al. | |
| 8,130,516 B2 | | 3/2012 | Komatsu et al. | |

(Continued)

FOREIGN PATENT DOCUMENTS

| CN | 101282088 A | * | 10/2008 |
|---|---|---|---|
| CN | 101552563 A | | 10/2009 |

(Continued)

OTHER PUBLICATIONS

English translation of CN101282088.*

(Continued)

*Primary Examiner* — Timothy J Dole
*Assistant Examiner* — Carlos Rivera-Perez
(74) *Attorney, Agent, or Firm* — Slater Matsil, LLP

(57) ABSTRACT

In accordance with an embodiment, a method of operating a switched-mode power supply includes turning on a semiconductor switch coupled to a primary winding of a transformer for a first time period of a first cycle, turning off the semiconductor switch for a second time period of the first cycle, detecting a change in slew rate of a voltage at an output node of the semiconductor switch, determining a switch turn-on time based on detecting the change in the slew rate, and turning on the semiconductor switch at the determined switch turn-on time for a first time period of a second cycle.

23 Claims, 8 Drawing Sheets

(56) References Cited

U.S. PATENT DOCUMENTS

| | | |
|---|---|---|
| 8,213,203 B2 | 7/2012 | Fei et al. |
| 8,786,375 B2 | 7/2014 | Feldtkeller |
| 8,824,173 B2 | 9/2014 | Fang et al. |
| 2006/0250823 A1 | 11/2006 | Murata et al. |
| 2009/0108948 A1 | 4/2009 | Kim |
| 2010/0013566 A1 | 1/2010 | Kim |
| 2010/0090772 A1 | 4/2010 | Hu et al. |
| 2010/0164638 A1 | 7/2010 | Saw |
| 2010/0238689 A1 | 9/2010 | Fei et al. |
| 2011/0157923 A1 | 6/2011 | Ren et al. |
| 2011/0305047 A1* | 12/2011 | Jungreis .............. H02M 1/08 363/21.02 |
| 2013/0119881 A1* | 5/2013 | Fang .............. H05B 33/0815 315/210 |
| 2013/0223108 A1 | 8/2013 | Xu |
| 2014/0146578 A1* | 5/2014 | Fang .............. H02M 3/33507 363/21.13 |
| 2015/0019882 A1* | 1/2015 | Irish .............. G06F 1/26 713/300 |
| 2015/0214829 A1* | 7/2015 | Xu .............. H02M 1/083 363/21.03 |

FOREIGN PATENT DOCUMENTS

| | | |
|---|---|---|
| CN | 103368400 A | 10/2013 |
| DE | 10200427373 A1 | 1/2005 |
| DE | 112007000220 T5 | 12/2008 |
| WO | 2004107576 | 12/2004 |

OTHER PUBLICATIONS

"FSEZ1317, Primary-Side-Regulation PWM with Power MOSFET Integrated," Fairchild Semiconductor Corporation, www.fairchildsemi.com, Rev. 1.0.5, Jan. 2011, 17 pgs.

"Off-Line SMPS Current Mode Controller with integrated 650V Startup Cell/Depletion CoolMos," Infineon, CoolSET™ -F3, Datasheet, Version 2.3, Apr. 2013, 32 pgs.

Jie, S. et al., "Design and Application Notes for AP3765 System Solution," Application Note 1064, BCD Semiconductor Manufacturing Limited, Rev. 1.1, Jun. 2011, 7 pgs.

\* cited by examiner

SYSTEM AND METHOD FOR A SWITCHED-MODE POWER SUPPLY

TECHNICAL FIELD

The present disclosure relates generally to an electronic device, and more particularly to a system and method for a switched mode power supply.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

A SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

One application of an SMPS is a charger for a lithium ion battery. Since lithium-ion batteries are prone to damage if an upper voltage limit is exceeded, it is common to charge the battery with a constant current until the output voltage reaches a target voltage. As result, such a battery charger may utilize a SMPS that is configured to provide a constant current. Because such battery chargers may convert AC current from a wall socket to a DC current, flyback converters that use a transformer are commonly used to provide galvanic isolation from the AC mains to the battery being charged.

There are number of different ways that a constant current may be maintained at the output of a flyback SMPS. For example, a current measurement may be performed at the output or secondary side of the flyback converter and fed back to a controller that operates the primary side switches of the flyback converter. Another way that a constant current may be maintained in a flyback SMPS is through primary current regulation in which an output current is indirectly sensed at the primary side of the SMPS.

SUMMARY OF THE INVENTION

In accordance with an embodiment, a method of operating a switched-mode power supply includes turning on a semiconductor switch coupled to a primary winding of a transformer for a first time period of a first cycle, turning off the semiconductor switch for a second time period of the first cycle, detecting a change in slew rate of a voltage at an output node of the semiconductor switch, determining a switch turn-on time based on detecting the change in the slew rate, and turning on the semiconductor switch at the determined switch turn-on time for a first time period of a second cycle.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for a switched-mode power supply in a flyback configuration. Embodiments of the present invention may also be applied to other switched-mode power supply configurations and other systems and applications including other circuits that switch including, but not limited to power systems and motor control systems.

In an embodiment of the present invention, the primary and secondary current of a flyback converter are controlled by setting the peak current flowing though the primary winding and controlling the ratio of time that the primary winding is being charged with respect to the total time in a cycle. During operation, a switch coupled to a primary winding of a transformer is turned on until the current in primary winding reaches a peak current. When the switch is turned off, current flows through the secondary winding of the transformer until the secondary winding is demagnetized. The switch is once again turned on for another cycle once the switch has been turned off long enough to meet the ratio of time that the primary winding is being charged with respect to the total time in a cycle. Errors in implementing this ratio are reduced, for example, by detecting the time at which the secondary coil is demagnetized and by compensating for timing errors in the detection of this condition. Variations of these timing errors that are affected by changes in the primary side supply voltage may also be compensated.

In one embodiment, the time at which the secondary coil is demagnetized is detected by determining when a slope of the voltage at an output node of the switch changes. This slope or slew rate detection may be implemented by capacitively coupling the output node of the switch to a detection circuit. Changes in primary side supply voltage that affect the manner in which the slope of the voltage at an output node of the switch changes are compensated by introducing a compensating delay that is dependent on the primary side supply voltage.

Figure 1A:
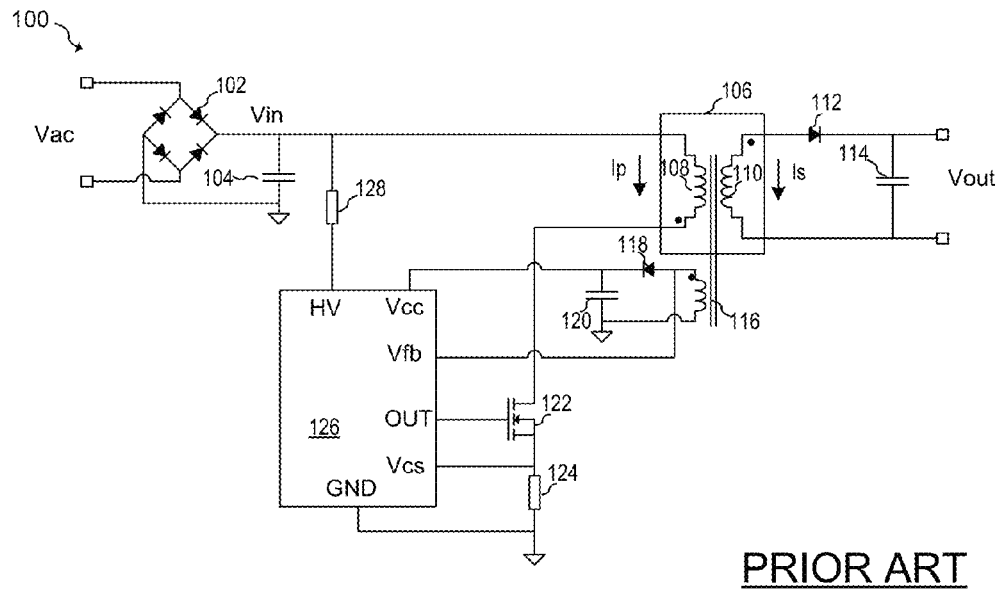
FIGS. 1a-b illustrate a schematic diagram of a conventional flyback switched-mode power converter and an associated waveform diagram.

FIG. 1a illustrates conventional switched-mode flyback converter 100 that includes diode bridge rectifier 102, transformer 106, switching transistor 122 and controller 126. Diode bridge rectifier 102 converts AC voltage Vac, which may represent, for example, an AC mains voltage to DC voltage Vin coupled to primary winding 108 of transformer 106. Residual ripple from the rectifying operation is filtered by input filter capacitor 104. The switching action of switching transistor 122 magnetizes and demagnetizes primary winding 108 of transformer 106 to transfer power from primary winding 108 to secondary winding 110. The output current at secondary winding 110 is rectified with output rectifier 112 and filtered with output capacitor 114 to produce DC output voltage Vout. Output rectifier 112 may be implemented, for example, with a diode or with another circuit, such as a synchronous rectifier.

As shown, secondary winding 110 does not have a feedback network coupled from the secondary side of transformer 106 to the primary side of transformer 106. Rather, switched-mode flyback converter 100 derives its feedback voltage by monitoring the voltage of auxiliary winding 116 that is magnetically coupled to transformer 106. This feedback voltage from auxiliary winding 116 is monitored by controller 126 at pin Vfb. In addition, controller 126 performs a measurement of the primary side current by monitoring the voltage across current sensing resistor 124 coupled to the source of switching transistor 122 at pin CS. Based on feedback taken from pins Vfb and VS, controller 126 produces a switching pattern at pin OUT coupled to the gate of switching transistor 122 in an attempt to maintain a generally stable output voltage and/or output current.

During operation, power is provided to controller 126 via auxiliary winding 116, diode 118 and capacitor 120. During startup, controller 126 may receive power from voltage Vin via resistor 128.

Figure 1B:
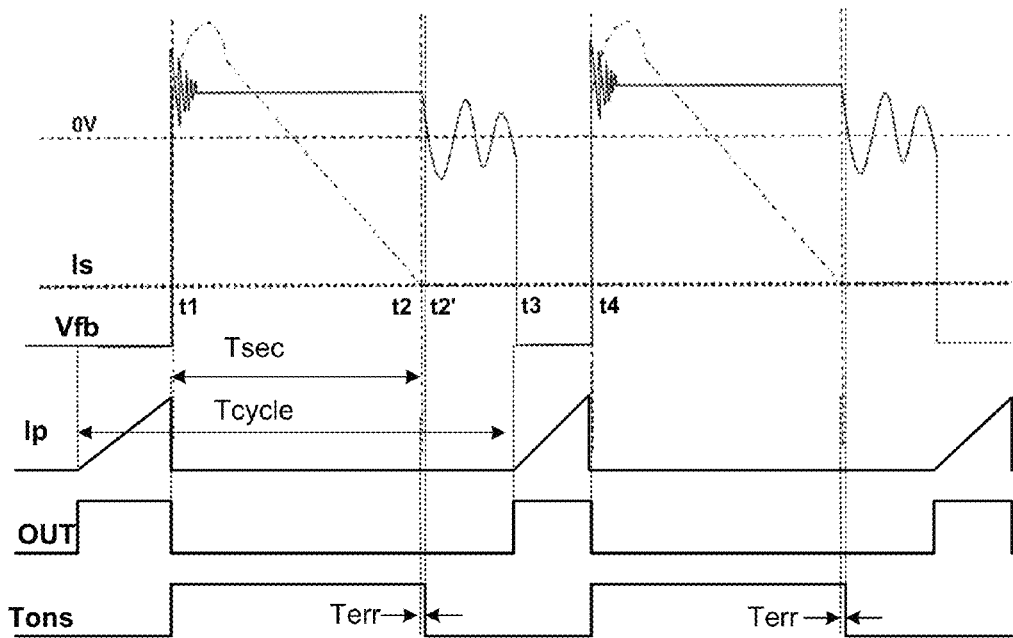

Referring to FIG. 1b, the primary winding current Ip increases when node OUT activates switching transistor 122, for example, between time t3 and time t4. The slope of the increase of the primary current IP when switching transistor 122 is activated is substantially proportional to the voltage level of the input voltage Vin and substantially inversely proportional to the inductance L of the primary winding 108 and the transformer, respectively. That is:

$$dI\text{in}/dt = V\text{in}/L.$$

When switching transistor 122 is activated, a voltage across primary winding 108 substantially corresponds to voltage Vin and a voltage across secondary winding 110 substantially corresponds to $-N22/N21 \cdot V\text{in}$, where N21 represents the number of windings of primary winding 108 and N22 represents the number of windings of secondary winding 110. As the voltage across the secondary winding 110 is negative during the on-period (which is by virtue of the primary winding 108 and the secondary winding 110 having opposite winding senses) current Is through the secondary winding 110 is zero when switching transistor 122 is activated.

When switching transistor 122 is deactivated, for example, at times t1 and t4, the voltage across the primary winding 108 and, consequently, the voltage across the secondary winding 110 reverses polarity and increases until the voltage across the secondary winding 110 substantially corresponds to the output voltage Vout plus a voltage a diode voltage across output rectifier 112. This diode voltage may correspond, for example to the forward voltage of diode 112. When output rectifier 112 is deactivated, primary winding 108 is demagnetized and transfers the energy that was inductively stored in the primary winding 108 to secondary winding 110 and to output Vout. As shown, primary current Ip decreases to zero at times t1 and t4 when switching transistor 122 is shut off, and current Is though secondary winding 110, which was zero when switching transistor 122 was active, jumps to an level at the times t1 and t4 and then starts to decrease.

By virtue of the inductive coupling between the auxiliary winding 116 and the primary winding 108, the voltage level of the auxiliary voltage Vfb during the time that switching transistor 122 is active (i.e., when driving voltage OUT is high) substantially corresponds to:

$$V\!f\!b = -N23/N21 \cdot V\text{in},$$

where N23 represents the number of windings of the auxiliary winding 116. When switching transistor 122 is inactive, (i.e., when node OUT is low), the voltage level of the auxiliary voltage Vaux substantially corresponds to:

$$V\text{aux} = N23/N22 \cdot (V\text{out} + V\text{diode}),$$

as long as the current Is through the secondary winding 110 has not decreased to zero. As the secondary side current Is decreases to zero, that is, as the transformer is completely demagnetized, the secondary side voltage and, consequently, the auxiliary voltage Vfb becomes zero. Parasitic effects such as, for example, parasitic capacitances of the transformer may cause ringing or oscillations of the auxiliary voltage Vfb, at the time when transformer 106 has become demagnetized, as shown in the plot of Vfb starting at time t2. This ringing occurs because output rectifier 112 on the secondary side of transformer 106 reverses polarity and presents an open circuit to secondary winding 110. As such, the impedance at the drain of switching transistor 122 appears as a parallel resonance that includes the inductance of primary winding 108 in parallel with the capacitance coupled to the drain of the switching transistor.

Controller 126 may use this ringing phenomenon to determine when the secondary winding 110 has become demagnetized in order to perform a primary-side control of the output current. For example, by controlling the peak primary current Ip and the ratio of the time during which secondary winding 110 is discharges (Tsec) to the total cycle time (Tcycle), the output current to the power supply load is controllable to the extent that these quantities may be accurately measured and/or controlled.

Referring to FIG. 1b, the auxiliary voltage Vfb, like the primary voltage and the secondary voltage, changes polarity when switching transistor 122 is shut off, for example at times t1 and t4. Vfb also changes polarity and when switching transistor 122 is turned on, for example at time t3, as well. In some cases, the zero crossing of signal Vfb is used to detect the time at which secondary winding 110 is demagnetized. When detecting the demagnetization time based on the zero crossing of Vfb, however, this is time error Terr that represents the delay between the time that secondary winding 110 is demagnetized and the time that voltage Vfb crosses zero. This delay may cause errors in the controlled load current. In addition, this delay may vary over temperature, power supply variation, circuit loading and other parameters and conditions.

Figure 2A:
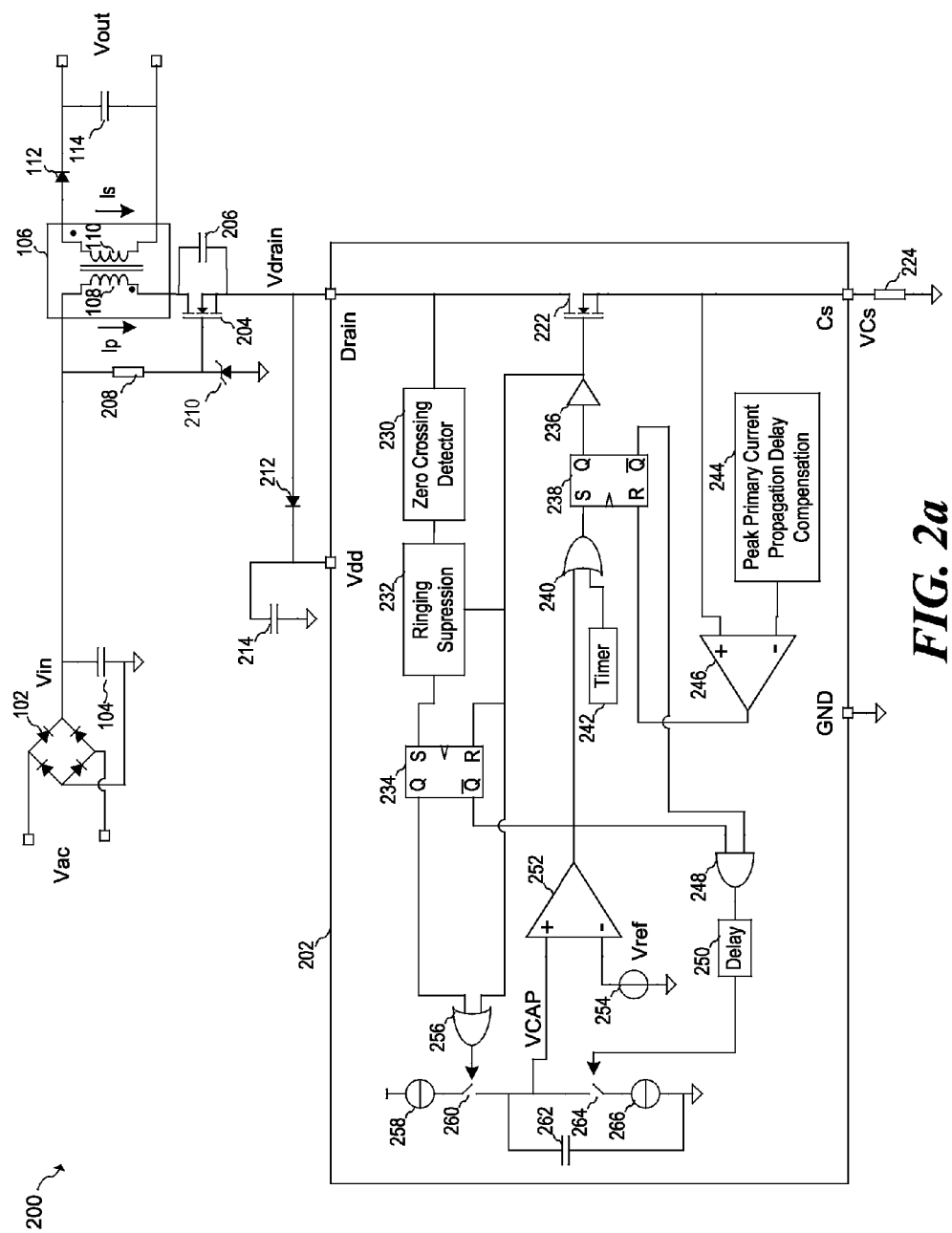
FIGS. 2a-d illustrate a schematic diagram of an embodiment flyback switched mode power converter and associated waveform diagrams.

FIG. 2a illustrates flyback converter 200 according to an embodiment of the present invention. As shown, embodiment flyback converter 200 includes diode bridge rectifier 102, and transformer 106. Embodiment controller 202 is configured to provide primary side current control for loads coupled to output Vout and includes switching transistor 222 coupled to transformer 106 via cascode transistor 204. In some embodiments, embodiment controller may be implemented on a single integrated circuit. Alternatively, controller 202 may be partitioned differently. For example, switching transistor 222 may be implemented as a discrete component.

In various embodiments, controller 202 may be configured to provide primary side constant current control for a load. In such embodiments, the output current can be obtained by averaging the triangular current of output rectifier 112 over a switching cycle:

$$I_O = I_{PK}(N_P/N_S)(t_{DIS}/2t_s),$$

where $I_O$ is the output current, $I_{PK}$ is the peak primary side current, $N_P/N_S$ is the transformer winding ratio between primary and secondary side, $t_{DIS}$ is the $D_R$ diode current discharge time, and $t_S$ is the switching period. In constant current control, there are two parameters that affect the output current accuracy with respect to transformer and AC mains voltage. They are the peak primary current control and the determination of the $D_R$ diode current discharge time.

Regarding peak primary current control, the peak secondary current is dependent on the transformer turn and the peak primary current. The transformer turns ratio is generally fixed and normally does not have a spread. The only main factor affecting the peak secondary current control is the peak primary current control. Due to propagation delays in the system, the peak primary current value might change with different AC mains voltage. This issue may be addressed, for example, by comparing voltage Vcs with a variable time dependent voltage reference as described in U.S. Pat. No. 6,665,197, which has been incorporated by reference herein in its entirety. In an embodiment, this functionality is implemented by comparator 246 that compares voltage Vcs with the output of peak primary current propagation delay compensation circuit 244 to reduce output current variations due to propagation delay in peak primary current detection path. The output of comparator 246 is used to shut off switching transistor 222 via SR latch 238 and switch driver 236.

Regarding the determination of output rectifier 112 current discharge time, timing errors in the detection of the demagnetization of secondary winding 110 are minimized, for example, by detecting the demagnetization of secondary winding 110 by sensing a change in slope of voltage Vdrain at the drain of switching transistor 222. In the illustrated embodiment, transformer does not include an auxiliary winding.

Figure 2B:
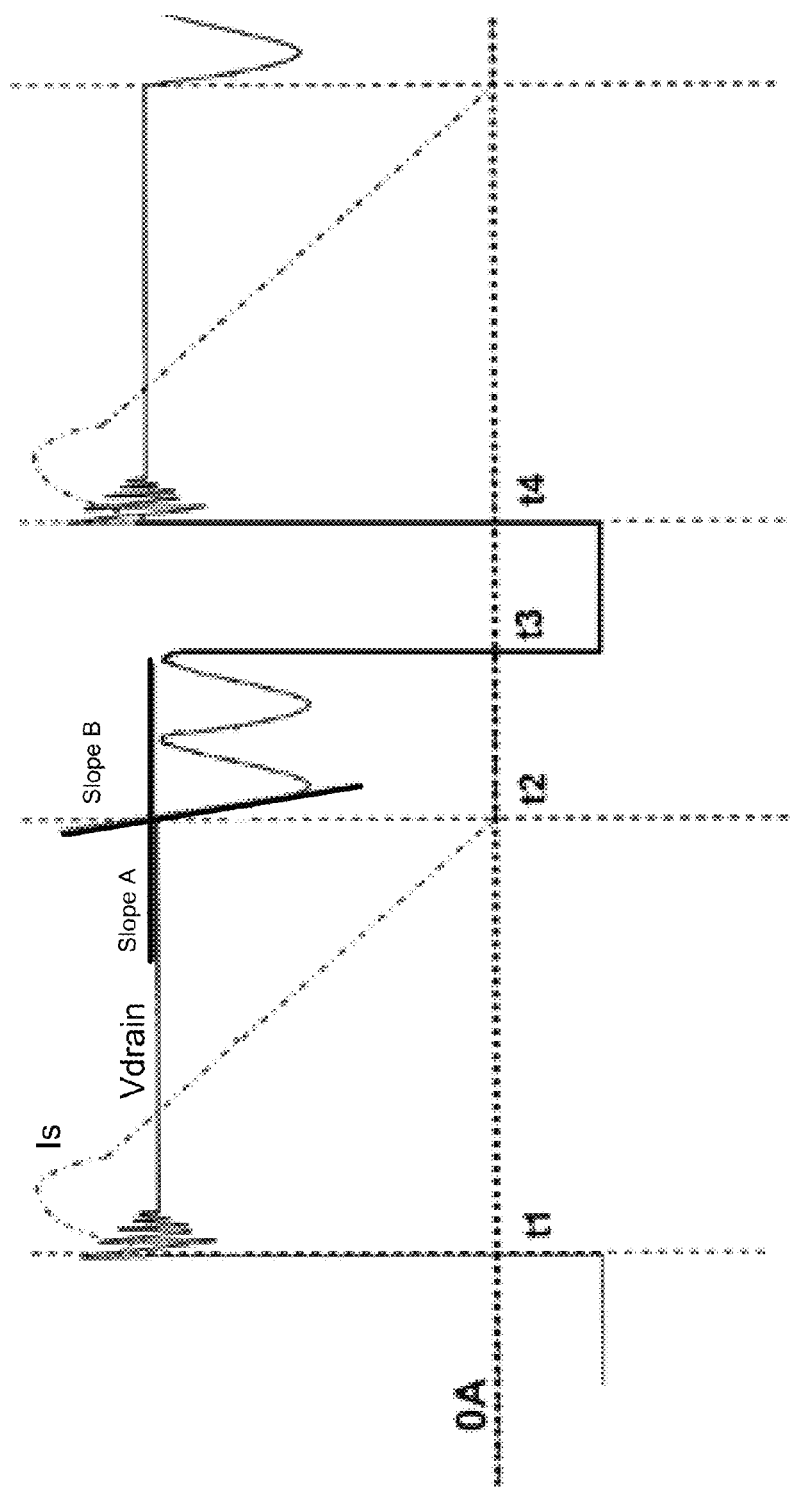

FIG. 2b illustrates a waveform diagram of secondary current Is and Vdrain that corresponds to the operation of embodiment flyback converter 200. As shown, when secondary winding 110 is demagnetizing, voltage Vdrain has a first slope A that is proportional to the slope of output voltage Vout. Under lightly loaded conditions, this slope A may be small, while in heavier loaded conditions this slope A may be larger. When secondary winding 110 is demagnetized, however, the slope of Vdrain changes to slope B at time t2. As is apparent in the FIG. 2b, time t2 occurs prior to the first oscillation cycle of voltage Vdrain, thus, in some embodiments, detecting the demagnetization of secondary winding 110 by detecting the change in slope is faster than detecting the demagnetization of secondary winding 110 by detecting zero crossings of oscillating signals.

Turning back to FIG. 2a, embodiment controller 202 detects the change in slope using zero crossing detector 230 coupled to the drain of switching transistor 222. Ringing suppression circuit 232 deglitches the output of zero crossing detector 230 and prevents an accidental detection of a zero crossing when switching transistor 222 is turned off. The output of ringing suppression circuit 232 is coupled to SR latch 234 that activates current source 266 via delay circuit 250 and switch 264.

In an embodiment, the ratio of the discharge time of secondary winding 110 to the total cycle time is controlled by charging and discharging timing capacitor 262 with current sources 258 and 266 controlled by switches 260 and 264, respectively. Alternatively, current sources 258 and 266 may be controlled in a different manner, for example, by directly turning on and off current sources 258 and 266 using current switching circuits and methods known in the art.

Figure 2C:
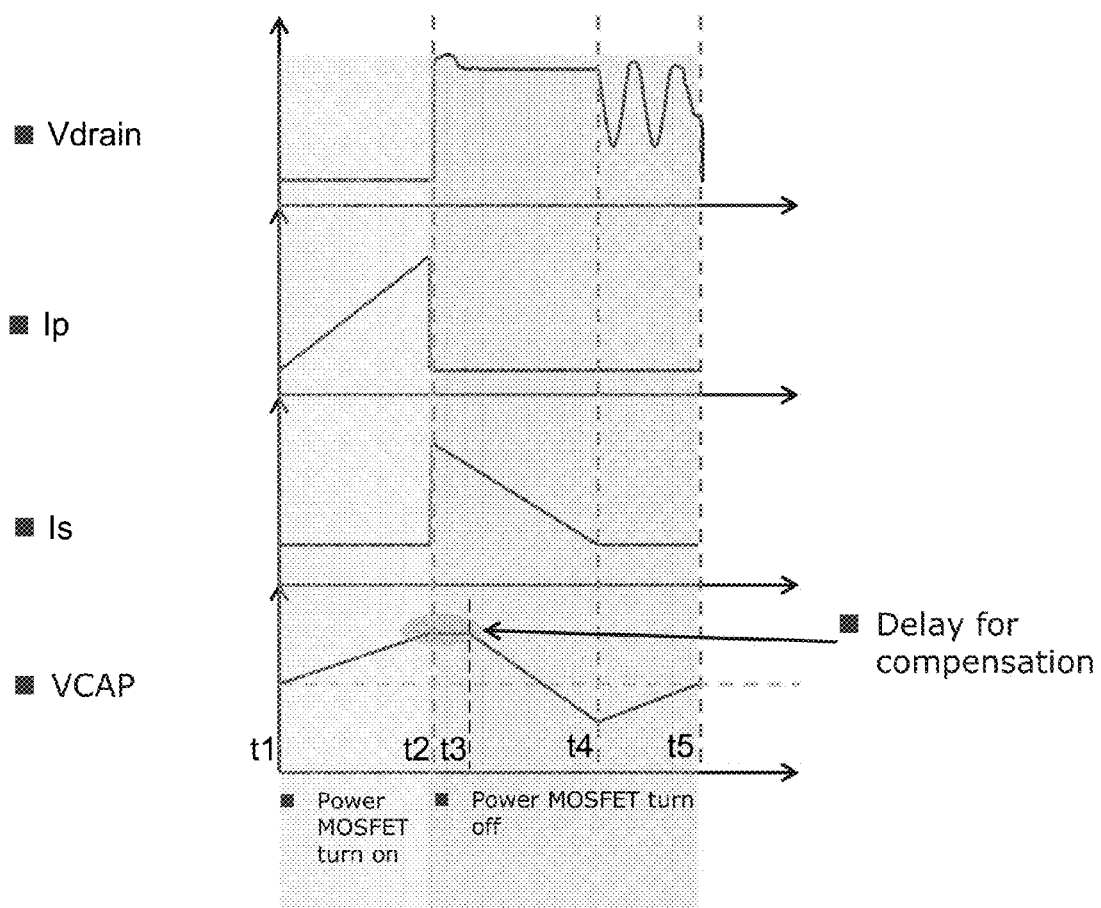

FIG. 2c shows waveform diagrams that illustrated the operation of an embodiment primary side current control method. In an embodiment, switching transistor 222 is turned-on at time t1. From time t1 to t2, primary current Ip linearly increases with time. During this time, timing capacitor 262 is being charged. When voltage Vcs of the CS pin crosses the threshold provided by peak primary current propagation delay compensation circuit 244 as detected by comparator 246, switching transistor 222 is shut off. Pin CS is coupled to resistor 224 in order to provide a voltage proportional to primary side current Ip. Once this threshold is detected, switching transistor 222 is turned off via SR latch 238 and switch driver 236, thereby causing secondary winding 110 to discharge and to produce a linearly decreasing current. The output of comparator 246 also activates current source 266 via AND gate 248 and delay circuit 250. As shown in FIG. 2c, the effect of delay circuit 250 causes the voltage of VCAP to remain constant between times t2 and t3. In an embodiment, delay circuit 250 may be used to compensate delays in detecting the end condition of the demagnetization of secondary winding 110.

At time t3, timing capacitor 262 is discharged with current source 266 until zero crossing detector 230 detects a change in slope of Vdrain. In an embodiment, when zero crossing detector 230 detects the change in slope, current source 266 is turned off via SR latch 234, AND gate 248, delay circuit 250 and switch 264, and current source 258 is turned on via SR latch 234, OR gate 256 and switch 260. As a result, the timing capacitor 262 is charged and the voltage across timing capacitor increases after time t4. When voltage of VCAP crosses the threshold VREF (an internally generated reference) as determined by comparator 252, switching transistor 222 is turned on via OR gate 240, SR latch 238 and switch driver 236, thereby starting a new switching cycle. In an embodiment, the threshold voltage used by comparator 252 is proportional to power supply voltage Vdd in order to compensate for supply voltage variations in detection time for the demagnetization of secondary winding 110. In some embodiments, threshold VREF may be one half of power supply voltage Vdd. Alternatively, other voltages may be used for threshold VREF. Timer 242 is coupled to the input of OR gate 240 to provide a pulse to turn on switching transistor 222 at power up.

In an embodiment, power supply voltage Vdd is taken from voltage Vdrain, which is coupled to the source of cascode transistor 204 whose gate is biased with zener diode 210 and resistor 208, thereby making the source voltage of cascode transistor 204 clamped to a maximum voltage given by zener diode 210 clamp voltage minus the cascade transistor threshold voltage. Voltage Vdrain is further rectified with diode 212 and filtered with capacitor 214 to form the power supply voltage of embodiment controller 202. In some embodiments a lower AC mains voltage leads to a slower detection of the demagnetization of secondary winding 110. However, the on-time of switching transistor 222 is inversely proportional to the AC mains voltage. By making the threshold Vref of comparator 252 proportional to Vdd, and thereby also proportional to the AC mains voltage, switching transistor 222 is turned on earlier for lower AC mains voltages, thereby compensating for the slower detection time. In an embodiment, the DC offset Vref of threshold voltage 254 may be adjusted, as well as its proportional relationship to Vdd in order to more fully compensate for the effect on AC mains voltage on the detection time for the demagnetization of secondary winding 110. In some embodiments, the difference in detection delays due to different AC mains voltages may be compensated using delay block 250 shown in FIG. 2a.

Figure 2D:
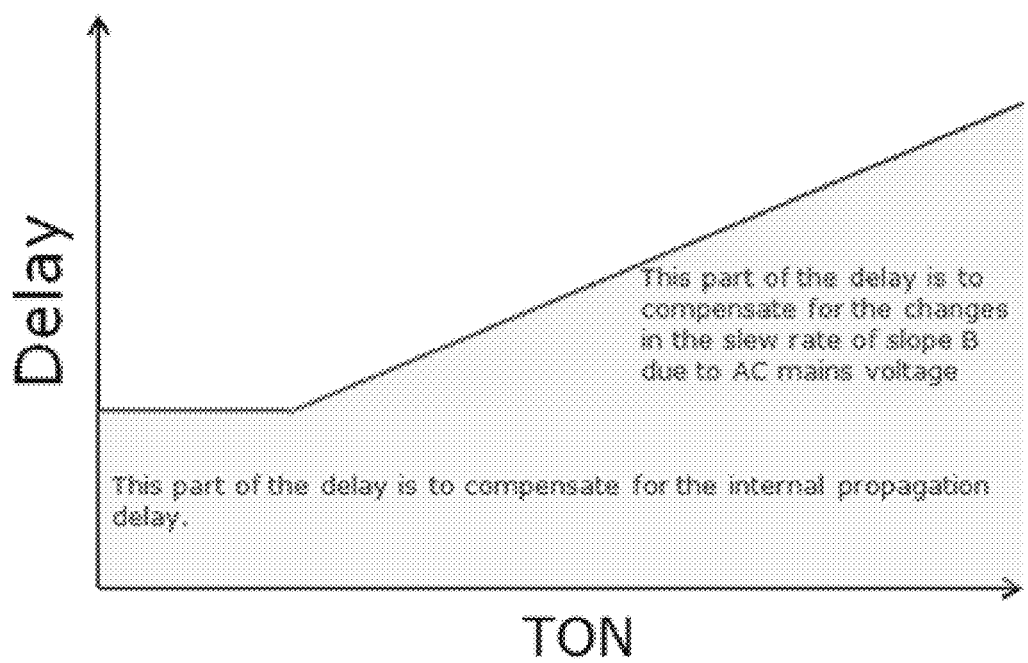

FIG. 2d illustrates a graph of delay compensation vs. on-time of switching transistor 222. As shown, for short on-times, a constant delay is added to account for constant propagation delays within the demagnetization detection path. This propagation delay compensation is implemented, for example, using delay circuit 250. For longer on-times, additional delay compensation is added to compensate for the effect of AC mains voltage on the detection time for the change in slope of Vdrain when secondary winding 110 is demagnetized.

Figure 3:
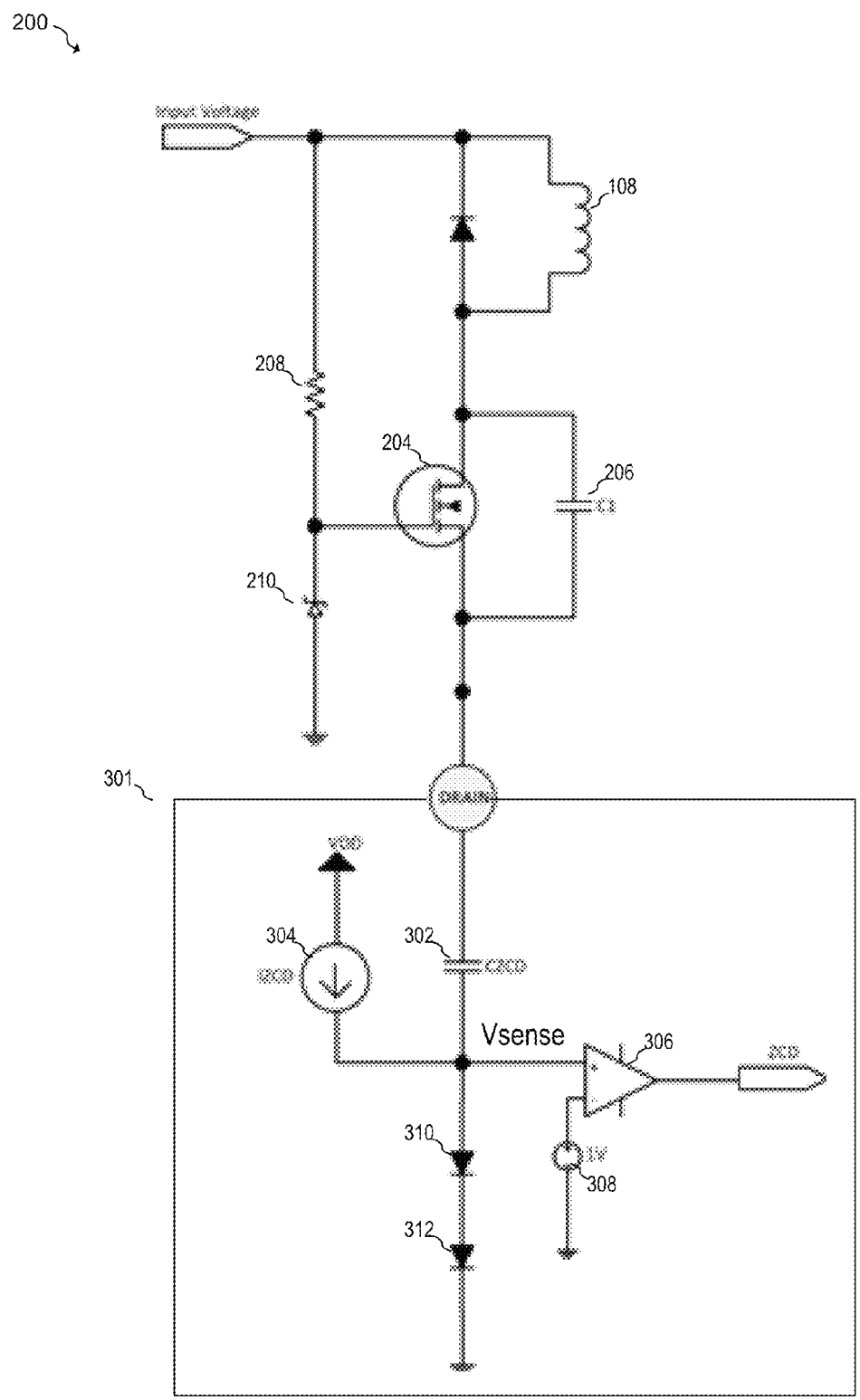
FIG. 3 illustrates a schematic of an embodiment zero crossing detector circuit.

FIG. 3 illustrates an embodiment zero crossing circuit 301 that may be used to implement zero crossing detector 230 shown in FIG. 2a. Cascode transistor 204, primary winding 108, zener diode 210 and resistor 208 are shown to illustrate how zero crossing circuit 301 interfaces with external circuitry of the switched-mode power supply. In an embodiment, comparator 306 is coupled to Vdrain via capacitor 302. The positive input of comparator 306 is biased using current source 304 and diodes 310 and 312, however, any equivalent comparator and bias structure may be used in alternative embodiments. In an embodiment, comparator 306 compares the voltage of capacitor 302 with reference voltage 308. It should be understood that comparator 306 may be implemented and reference voltage 308 may be generated using circuits and methods known in the art. During operation, capacitor 302 implements a high pass filter that is responsive to fast changes in voltage slopes at Vdrain. Diodes 310 and 312 may be used to ensure, for example, that voltage Vsense at the input of comparator 306 does not go too far below ground. In some embodiments, capacitor 206 is coupled between the drain and source of cascode transistor 204 in order to increase detection speed.

Figure 4:
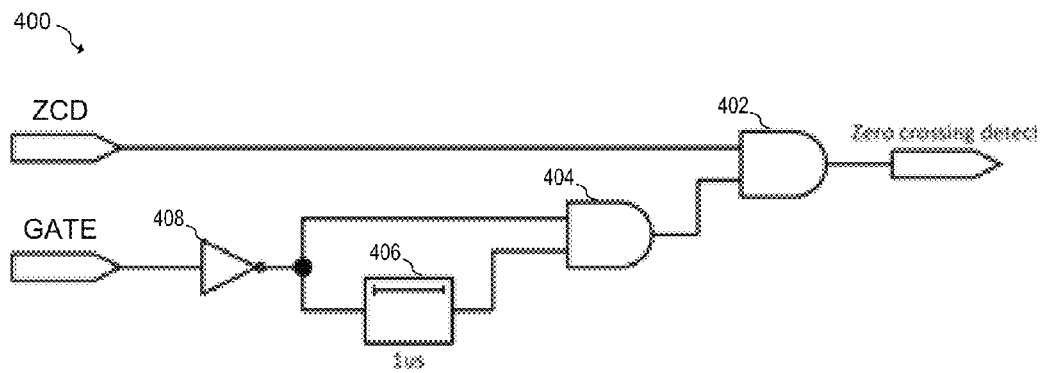
FIG. 4 illustrates a schematic of an embodiment ringing suppression circuit.

FIG. 4 illustrates embodiment ringing suppression circuit 400 that may be used to implement ringing suppression circuit 232 shown in FIG. 2a. The basic function of the ringing suppression block 232 is to reject any zero crossing detected within a certain time interval from the time that the gate of the switching transistor is turned off. Pin ZCD is coupled to the output of zero crossing detector 230 and pin GATE is coupled to the gate of switching transistor 222. In an embodiment, when pin GATE transitions from high to low, thereby causing the output of inverter 408 to transition from low to high, a short pulse is produced at the output of AND gates 402 and 404. The length of this pulse is determined, for example, by the amount of delay produced by delay block 406, which, in the illustrated case is about 1 µs. In alternative embodiments of the present invention, other deglitching circuits known in the art and/or other logically and functionally similar circuit may be used.

Figure 5:
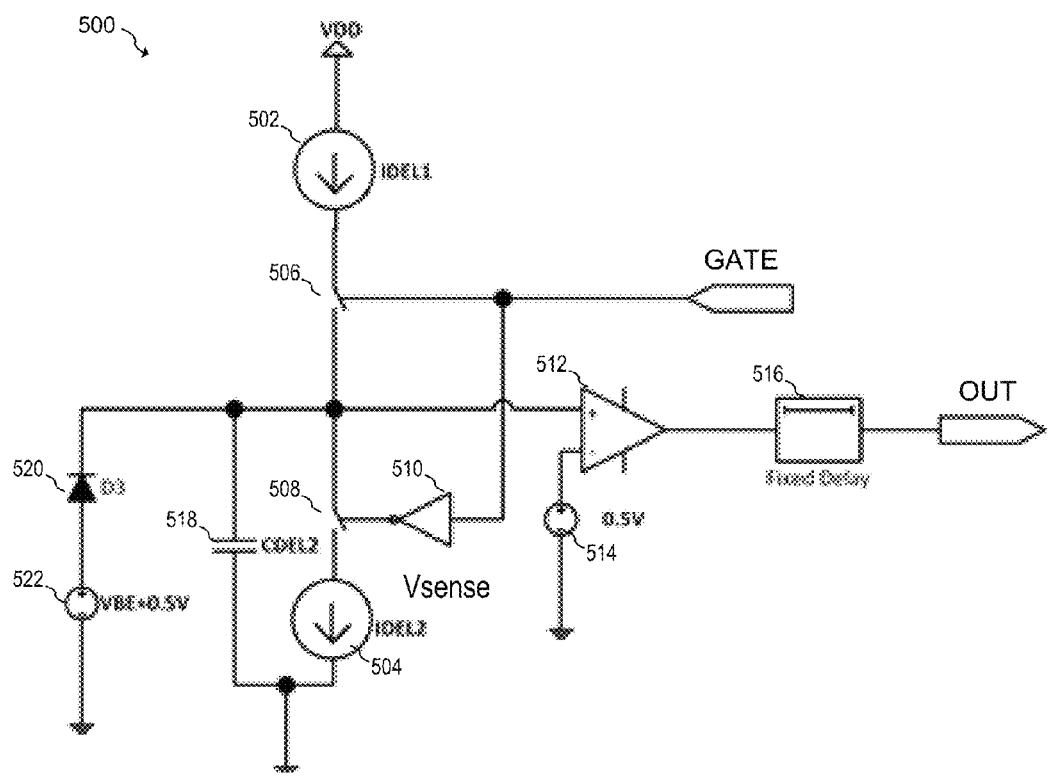
FIG. 5 illustrates a schematic of an embodiment delay circuit.

FIG. 5 illustrates embodiment delay circuit 500 that may be used to implement delay circuit 250 shown in FIG. 2a. In an embodiment, delay circuit 500 delays a logical input at node GATE to provide output signal OUT. The delay of this circuit includes a fixed delay implemented by fixed delay circuit 516 that represents the constant delay region of FIG. 2d, and current sources 502 and 504 along with capacitor 518 implement a variable delay that represents the variable delay region of FIG. 2d. During operation, when the voltage of input GATE goes high, current source 502 is activated via switch 506. When the voltage across capacitor 518 crosses the threshold of comparator 512, as represented by voltage source 514, the output at node OUT changes from low to high after fixed delay 516. On the other hand, when the voltage at input GATE goes low, current source 504 is activated via inverter 510 and switch 508, thereby causing the voltage across capacitor 518 to decrease. The output at node OUT then goes low after comparator 512 is triggered an after fixed delay 516. In an embodiment, the current of discharging current source 504 is variable current that may be varied according to the length of time that switching transistor 222 is turned on. In some embodiments, the voltage of capacitor 518 is clamped to a minimum voltage using voltage reference 522 and diode 510.

Figure 6:
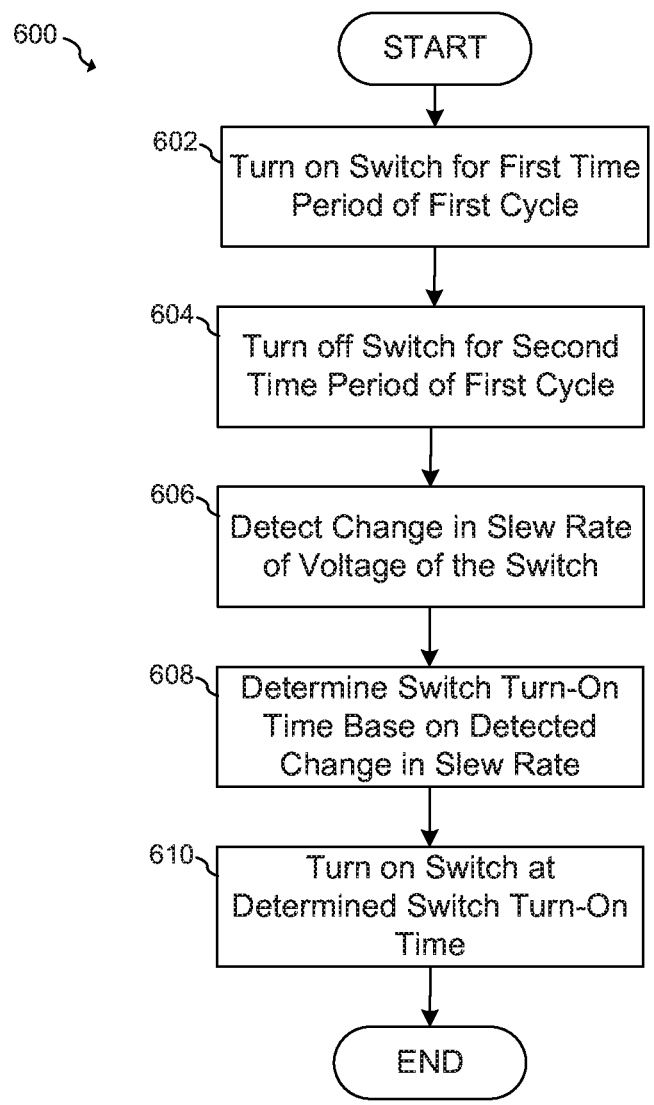
FIG. 6 illustrates a flowchart of an embodiment method.

FIG. 6 illustrates a flowchart of an embodiment method 600. In step 602, a switch coupled to a primary winding of a transformer of a flyback converter is turned on for a first time period of a first cycle. During this first time period, the primary winding of the transformer is magnetized. Next, in step 604, the switched is turned off for a second time period in the first cycle. During this time, the secondary winding of the transformer provides current to the load of the flyback converter until the secondary winding is demagnetized. This demagnetization is detected by detecting a change in slew rate of a voltage of the switch in step 606. A turn-on time is determined based on detecting the change in slew rate in step 608 and the switch is turn on at the determined turn on time in step 610.

In accordance with an embodiment, a method of operating a switched-mode power supply includes turning on a semiconductor switch coupled to a primary winding of a transformer for a first time period of a first cycle, turning off the semiconductor switch for a second time period of the first cycle, detecting a change in slew rate of a voltage at an output node of the semiconductor switch, determining a switch turn-on time based on detecting the change in the slew rate, and turning on the semiconductor switch at the determined switch turn-on time for a first time period of a second cycle. Detecting the change in slew rate may include capacitively coupling an output node of the semiconductor switch to a first coupled node and determining that the slew rate changed when the voltage of the first coupled node crosses a first threshold. The semiconductor switch may be implemented, for example, by a MOSFET such that the output node is a drain of the MOSFET.

In an embodiment, determining the switch turn-on time includes charging a capacitor with a first current of a first polarity during the first time period of the first cycle until the semiconductor switch is turned off, and then stop charging the capacitor with the first current when the semiconductor switch is turned off. After waiting a first delay period, the capacitor is charged with a second current of a second polarity opposite the first polarity until the change in slew rate is detected, and then the capacitor is charged with the first current after the change in slew rate is detected. The method further includes determining when a voltage of the capacitor crosses a first voltage threshold after the change in slew rate is detected.

In an embodiment, the turning on the semiconductor switch at the determined switch turn-on time includes turning on the semiconductor switch when the voltage of the capacitor crosses the first voltage threshold based on the determining. In some embodiments, the first voltage threshold is proportional to a power supply voltage of a switched-more power supply controller, and in some embodiments, the first delay period compensates for a delay in detecting a demagnetization of a second winding of the transformer. The method may further include determining a length of time of the first time period of the first cycle, determining comprising comparing a switch current to a second threshold.

In accordance with a further embodiment, a power supply control circuit includes a slew rate detection circuit coupled to a first terminal configured to be coupled to a first output node of a switching transistor. The slew rate detection circuit is configured to detect a change of slew rate at the first terminal. The power supply control circuit also includes a timing circuit coupled to an output of the slew rate detection circuit, a current detection circuit coupled to a second terminal configured to be coupled to a second output node of the switching transistor, and a switch driving circuit coupled to an output of the timing circuit and configured to be coupled to a control node of the switching transistor. The switch driving circuit is configured to deactivate the switching transistor when a detected current exceeds a first threshold, and is configured to activate the switching transistor when the timing circuit determines that a ratio of a first time period to a cycle time of the switching transistor has been met. The first time period includes a length of time from when the switching transistor is shut off to when a change in slew rate is detected by the slew rate detection circuit.

In an embodiment, the power supply control circuit further includes the switching transistor. The switching transistor may be implemented using, for example, a MOSFET such that the first output node of the switching transistor is a drain of the MOSFET, the second output node of the switching transistor is a source of the MOSFET, and the control node of the switching transistor is a gate of the MOSFET.

In an embodiment, the slew rate detection circuit, timing circuit, current detection circuit and switching transistor are disposed on a same integrated circuit. The slew rate detection circuit may include a comparator and a capacitance coupled between the first terminal and a first input node of the comparator.

In an embodiment, the timing circuit includes a timing capacitor, a first current source and a second current source coupled to the timing capacitor and a comparator having a first input coupled to the timing capacitor. The first current source is configured to charge the timing capacitor in a first direction and includes a first activation terminal coupled to an output of the slew rate detection circuit, The second current source is configured to charge the timing capacitor in a second direction opposite the first direction, and includes a second activation terminal coupled to an output of the current detection circuit.

In an embodiment, the power supply control circuit further includes a delay circuit coupled between the second activation terminal and the output of the current detection circuit. In some embodiments, the comparator includes a second input coupled to a voltage reference proportional to a voltage of power supply coupled to a primary winding of a switched mode power supply.

In accordance with a further embodiment, a switched-mode power supply circuit includes a slew rate detection circuit configured to be coupled to a first output node of a switching transistor and a controller configured to be coupled to a primary winding of a transformer. The controller is configured to turn on the switching transistor for a first time period of a first cycle, turn off the switching transistor for a second period of time of the first cycle, determine a switch turn-on time based on an output of the slew rate detection circuit, and turn on the switching transistor at the switch turn-on time. In some embodiments, the switch-mode power supply circuit further includes the switching transistor and/or the transformer. In an embodiment, the switched-mode power supply of claim 19, further includes a cascode transistor coupled between primary winding of the transformer and the switching transistor.

In an embodiment, the slew rate detection circuit includes a first comparator and a capacitance coupled between the first output node of the switching transistor and a first input node of the first comparator. The controller may include a timing capacitor; a first current source coupled to the timing capacitor, a second current source coupled to the timing capacitor; a second comparator having a first input coupled to the timing capacitor and a second input coupled to a first threshold voltage node; and a first delay circuit having a output node coupled to at least one of the first current source and the second current source. The first delay circuit may be configured to provide a delay of a first delay period.

The controller may be further configured to activate the first current source during the first time period of the first cycle until the switching transistor is turned off at the end of the first time period of the first cycle, and configured to stop activating the first current source at the end of the first time period of the first cycle. After waiting the first delay period, the controller may activate the second current source until the slew rate detection circuit detects a change in slew rate at the end of a first portion of the second period of time of the first cycle, activate the first current source at the end of the first portion of the second period of time, and determine the switch turn-on time when a voltage of the timing capacitor crosses a voltage of the first threshold voltage node. In an embodiment, the first threshold voltage node is configured to have a voltage proportional to a supply voltage of the primary winding.

Advantages of some embodiment power supply controllers include the ability to provide accurate primary side current control of a load. In some embodiment, this power control maintains its accuracy over variations of the AC mains voltage. In some embodiments, a simple transformer may be used to implement a flyback converter without having an auxiliary winding.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a switched-mode power supply, the method comprising:
   turning on a cascode transistor by coupling a gate of the cascode transistor to a supply terminal via a resistor;
   clamping a voltage of the gate of the cascode transistor with a Zener diode coupled to the gate of the cascode transistor; and
   when the cascode transistor is on, controlling an output current by turning on and off a semiconductor switch coupled to a primary winding of a transformer, wherein the controlling the output current comprises
  turning on the semiconductor switch for a first time period of a first cycle,
  turning off the semiconductor switch for a second time period of the first cycle,
  detecting a change in slew rate of a voltage at an output node of the semiconductor switch, wherein detecting a change in slew rate comprises
    capacitively coupling the output node of the semiconductor switch through a coupling capacitor to a drain of the cascode transistor having a source coupled to the output node of the semiconductor switch, the coupling capacitor being coupled from the drain of the cascode transistor to the source of the cascode transistor, and
    detecting through the coupling capacitor the change in slew rate at the drain of the cascode transistor,
  determining a switch turn-on time based on detecting the change in the slew rate, and
  turning on the semiconductor switch at the determined switch turn-on time for a first time period of a second cycle, wherein determining the switch turn-on time comprises:
    charging a capacitor with a first current of a first polarity during the first time period of the first cycle until the semiconductor switch is turned off,
    stop charging the capacitor with the first current when the semiconductor switch is turned off,
    holding a voltage with the capacitor for a first delay period after stopping charging the capacitor,
    after waiting the first delay period, discharging the capacitor with a second current of a second polarity opposite the first polarity until the change in slew rate is detected,
    charging the capacitor with the first current after the change in slew rate is detected, and
    determining when a voltage of the capacitor crosses a first voltage threshold after the change in slew rate is detected.

2. The method of claim 1, wherein detecting the change in slew rate comprises:
  capacitively coupling the output node of the semiconductor switch to a first coupled node;
  biasing the first coupled node with a bias signal generated by a current source coupled to the first coupled node, the first coupled node coupled to a first diode; and
  determining that the slew rate changed when the voltage of the first coupled node crosses a first threshold.

3. The method of claim 1, wherein:
  the semiconductor switch comprises a MOSFET; and
  the output node is a drain of the MOSFET.

4. The method of claim 1, wherein the turning on the semiconductor switch at the determined switch turn-on time comprises turning on the semiconductor switch when the voltage of the capacitor crosses the first voltage threshold based on the determining.

5. The method of claim 1, wherein the first voltage threshold is proportional to a power supply voltage of a switched-mode power supply controller.

6. The method of claim 1, wherein the first delay period compensates for a delay in detecting a demagnetization of a second winding of the transformer.

7. The method of claim 1, further comprising determining a length of time of the first time period of the first cycle, wherein determining the length of time of the first time period of the first cycle comprises comprising comparing a switch current to a second threshold.

8. The method of claim 1, wherein detecting the change in slew rate is performed based on a single input signal from the drain of the cascode transistor.

9. A power supply control circuit comprising:
  a slew rate detection circuit coupled to a first terminal configured to be coupled to a first output node of a switching transistor, wherein the slew rate detection circuit is configured to
    be capacitively coupled through a coupling capacitor to a drain of a cascode transistor having a source coupled to the first terminal and a gate coupled to a first supply terminal via a Zener diode and to a second supply terminal via a resistor, the coupling capacitor being coupled from the drain of the cascode transistor to the source of the cascode transistor, and
    detect a change of slew rate at the first terminal;
  a timing circuit coupled to an output of the slew rate detection circuit, wherein the timing circuit comprises:
    a timing capacitor,
    a first current source coupled to the timing capacitor, the first current source configured to charge the timing capacitor in a first direction and comprising a first activation terminal coupled to an output of the slew rate detection circuit through an OR gate, the OR gate further coupled to the gate of the switching transistor,
    a second current source coupled to the timing capacitor, the second current source configured to charge the timing capacitor in a second direction opposite the first direction, the second current source comprising a second activation terminal, and
    a comparator having a first input coupled to the timing capacitor;
  a current detection circuit coupled to a second terminal configured to be coupled to a second output node of the switching transistor, wherein the second activation terminal is coupled to an output of the current detection circuit;
  a delay circuit coupled between the second activation terminal and the output of the current detection circuit, the delay circuit configured to delay activation of the second current source by a first time to hold a voltage of the timing capacitor constant during the first time; and
  a switch driving circuit coupled to an output of the timing circuit and configured to be coupled to a control node of the switching transistor, wherein
    the switch driving circuit is configured to control an output current by turning on and off the switching transistor when the cascode transistor is on, wherein the controlling the output current comprises
      deactivating the switching transistor when a detected current exceeds a first threshold, and
      activating the switching transistor when the timing circuit determines that a ratio of a first time period to a cycle time of the switching transistor has been met, wherein the first time period comprises a length of time from when the switching transistor is shut off to when a change in slew rate is detected by the slew rate detection circuit.

10. The power supply control circuit of claim 9, further comprising the switching transistor.

11. The power supply control circuit of claim 10, wherein:
the switching transistor comprises a MOSFET;
the first output node of the switching transistor comprises a drain of the MOSFET;
the second output node of the switching transistor comprises a source of the MOSFET; and
the control node of the switching transistor comprises a gate of the MOSFET.

12. The power supply control circuit of claim 10, wherein the slew rate detection circuit, timing circuit, current detection circuit and switching transistor are disposed on a same integrated circuit.

13. The power supply control circuit of claim 9, wherein the slew rate detection circuit comprises:
a second comparator;
a capacitance coupled between the first terminal and a first input node of the second comparator;
a current source coupled to the first input node of the second comparator;
a first diode directly connected in a forward direction from the first input node of the second comparator to an intermediate node; and
a second diode directly connected in a forward direction from the intermediate node to a ground node.

14. The power supply control circuit of claim 9, wherein the comparator comprises a second input coupled to a voltage reference proportional to a voltage of power supply coupled to a primary winding of a switched mode power supply.

15. The power supply control circuit of claim 9, wherein the slew rate detection circuit is configured to detect a change of slew rate at the first terminal based on a single input signal from the drain of the cascode transistor.

16. A switched-mode power supply circuit comprising:
a slew rate detection circuit configured to be coupled to a first output node of a switching transistor and configured to be capacitively coupled through a coupling capacitor to a drain of a cascode transistor having a source coupled to the first output node of the switching transistor and a gate coupled to a first supply terminal via a Zener diode and pulled up to a second supply terminal via a resistor, the coupling capacitor being coupled from the drain of the cascode transistor to the source of the cascode transistor; and
a controller configured to be coupled to a primary winding of a transformer, wherein the controller is configured to control an output current when the cascode transistor is on, wherein the controlling the output current comprises
turning on the switching transistor for a first time period of a first cycle,
turning off the switching transistor for a second period of time of the first cycle,
determining a switch turn-on time based on an output of the slew rate detection circuit, and
turn on the switching transistor at the switch turn-on time, wherein the controller comprises:
a timing capacitor,
a first current source coupled to the timing capacitor,
a second current source coupled to the timing capacitor,
a second comparator having a first input coupled to the timing capacitor and a second input coupled to a first threshold voltage node, and
a first delay circuit having an output node coupled to at least one of the first current source and the second current source, the first delay circuit configured to provide a delay of a first delay period to hold a voltage of the timing capacitor constant during the first delay period.

17. The switched-mode power supply circuit of claim 16, further comprising the switching transistor.

18. The switched-mode power supply circuit of claim 17, further comprising the transformer.

19. The switched-mode power supply circuit of claim 18, further comprising the cascode transistor coupled between the primary winding of the transformer and the switching transistor.

20. The switched-mode power supply circuit of claim 16, wherein the slew rate detection circuit comprises:
a first comparator;
a capacitance coupled between the first output node of the switching transistor and a first input node of the first comparator;
a current source coupled to the first input node of the first comparator; and
a diode circuit coupled in a forward direction from the first input node of the first comparator to a reference node.

21. The switched-mode power supply circuit of claim 16, wherein the controlling the output current further comprises:
activating the first current source during the first time period of the first cycle until the switching transistor is turned off at the end of the first time period of the first cycle;
stop activating the first current source at the end of the first time period of the first cycle;
hold the voltage of the timing capacitor constant during the first delay period;
after waiting the first delay period, activating the second current source until the slew rate detection circuit detects a change in slew rate at the end of a first portion of the second period of time of the first cycle;
activating the first current source at the end of the first portion of the second period of time; and
determining the switch turn-on time when a voltage of the timing capacitor crosses a voltage of the first threshold voltage node.

22. The switched-mode power supply circuit of claim 16, wherein the first threshold voltage node is configured to have a voltage proportional to a supply voltage of the primary winding.

23. The switched-mode power supply circuit of claim 16, wherein the output of the slew rate detection circuit is generated by the slew rate detection circuit based on a single input signal.

* * * * *